United States Patent Office 3,787,453
Patented Jan. 22, 1974

3,787,453
STEROID CARBAMATES
Kenneth Earl Fahrenholtz, Bloomfield, N.J., assignor to
Hoffmann-La Roche Inc., Nutley, N.J.
No Drawing. Filed Oct. 26, 1971, Ser. No. 192,306
Int. Cl. C07c 169/20
U.S. Cl. 260—397.4      19 Claims

ABSTRACT OF THE DISCLOSURE

Carbamic acid esters of 3β-hydroxy-Δ$^4$ or Δ$^5$-steroids, which can be optionally substituted with chlorine in the 4 and/or 6-positions and which are useful as progestational, androgenic, anabolic, antiestrogenic and/or antigonadotropic agents, and a process for preparing these carbamic acid esters.

SUMMARY OF THE INVENTION

In accordance with this invention, it has been found that a compound selected from the group consisting of compounds of the formulas:

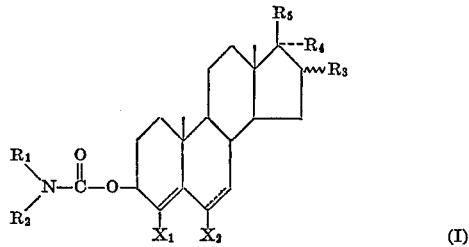

(I)

and

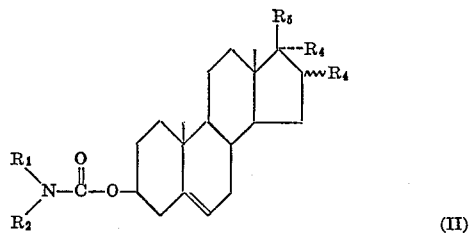

(II)

wherein $X_1$ and $X_2$ are halogen or hydrogen; $R_1$ and $R_2$ are hydrogen, lower alkyl, lower alkenyl or aryl; $R_3$ is hydrogen, lower alkyl or lower alkylidene; $R_4$ is individually hydrogen, lower alkyl, hydroxy or lower alkanoyloxy; $R_5$ is individually hydroxy, acetyl, lower alkanoyloxy or

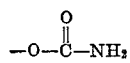

or $R_4$ and $R_5$ taken together form an oxo group; and the dotted bond is a single bond or a double bond between the carbon atoms in the 6 and 7 position; with the proviso that when $R_5$ is acetyl, $R_4$ is hydroxy or lower alkanoyloxy and when $R_5$ is

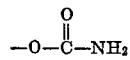

hydroxy or lower alkanoyloxy, $R_4$ is hydrogen or lower alkyl; and with the further proviso that when $X_1$ and $X_2$ are hydrogen, the dotted bond is a single bond;
exhibit endocrine activity. All compounds of Formulas I and II wherein $R_5$ is hydroxy, lower alkanoyloxy or

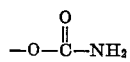

exhibit androgenic and/or anabolic activity and antigonadotropic activity. All compounds of Formulas I and II wherein $R_5$ is acetyl exhibit progestational activity and anti-estrogenic activity.

DETAILED DESCRIPTION OF THE INVENTION

As used throughout this application, the term "lower alkyl" comprehends straight chain and branched chain saturated hydrocarbon groups having from one to six carbon atoms, such as methyl, ethyl and isopropyl. Similarly, as used herein, the term "lower alkenyl" comprehends olefinically unsaturated hydrocarbons having from 2 to 6 carbon atoms such as vinyl, allyl, propenyl and butenyl. As also used herein, the term "lower alkanoyloxy" comprehends acyloxy groups having 1 to 6 carbon atoms such as formyloxy, acetyloxy and propionyloxy. As still further used herein, the term "halogen" includes fluorine, chlorine, bromine and iodine unless otherwise stated, with chlorine being preferred. As further used herein, the term "lower alkoxy" comprehends lower alkyloxy groups having 1 to 6 carbon atoms such as methoxy, ethoxy and propoxy. As still further used herein, the term "aryl" comprehends mono-nuclear aromatic hydrocarbons such as phenyl, tolyl, etc., preferably phenyl, which can also be unsubstituted or substituted in one or more positions with a nitro, halo, lower alkyl or lower alkoxy substituent, wherein "lower alkyl," "halo" and "lower alkoxy" are as defined above. As still further used herein, the term "lower alkylidene" comprehends lower alkylidene groups having from 1 to 6 carbon atoms such as methylene, ethylidene and propylidene.

In accordance with this invention, among the preferred compounds of Formula I are the pregnane compounds of the formula:

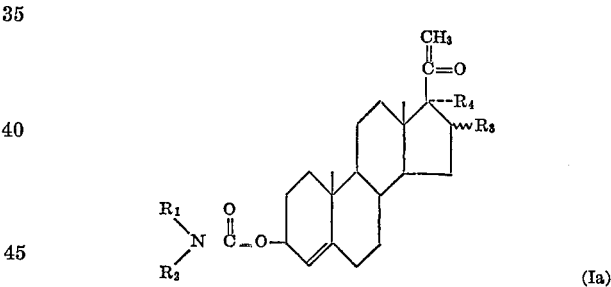

(Ia)

wherein $R_1$, $R_2$, $R_3$ and $R_4$ are as above.

Among the compounds of Formula Ia, the particularly preferred compounds of Formula I include compounds wherein the 16ε-substituent $R_3$ is hydrogen.

In accordance with this invention, also among the preferred compounds of Formula I are the pregnane compounds of the formula:

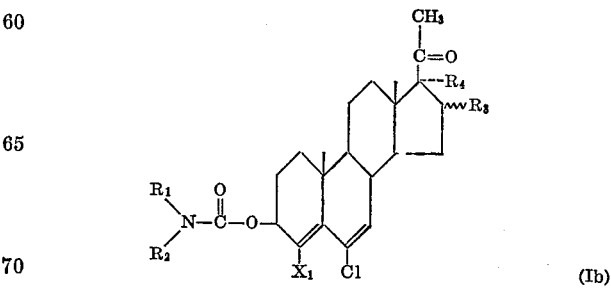

(Ib)

wherein $X_1$, $R_1$, $R_2$, $R_3$ and $R_4$ are as above.

Among the compounds of Formula Ib, the particularly preferred compounds of Formula I include the compounds of the formula:

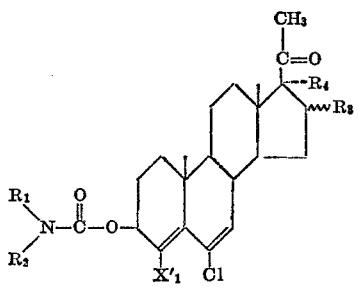
(Ic)

wherein $R_1$, $R_2$, $R_3$ and $R_4$ are as above and $X'_1$ is hydrogen or chlorine.

In accordance with this invention, further among the preferred compounds of Formula I are the androstane compounds of the formula:

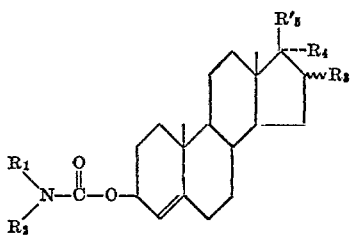
(Id)

wherein $R_1$, $R_2$, $R_3$ and $R_4$ are as above; and $R'_5$ is individually hydroxy or lower alkanoyloxy or $R_4$ and $R'_5$ taken together form an oxo group.

Among these compounds of Formula Id, the particularly preferred compounds of Formula I include compounds wherein the 16ε-substituent $R_3$ is hydrogen.

In accordance with this invention, among the preferred compounds of Formula II are the androstane compounds of the formula:

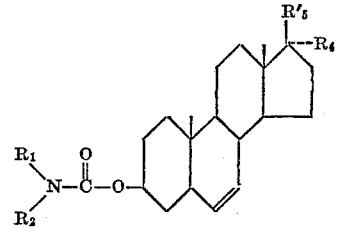
(IIa)

wherein $R_1$, $R_2$, $R_4$ and $R'_5$ are as above.

Among these compounds of Formula IIa, the particularly preferred compounds of Formula II include compounds wherein the 17α-substituent $R_4$ is hydrogen or methyl.

One method for obtaining the compounds of Formula I or II is by reacting a compound selected from the group consisting of compounds of the formulas:

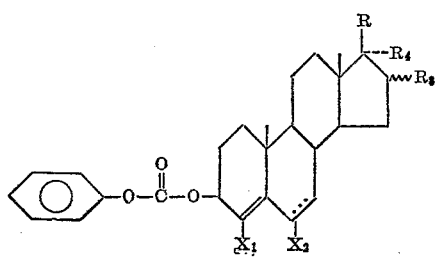
(IIIa)

and

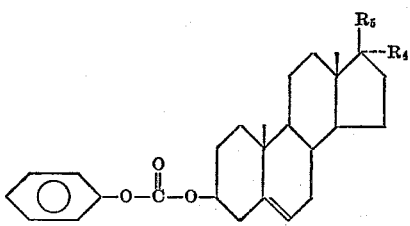
(IIIb)

wherein $X_1$, $X_2$, $R_3$, $R_4$, $R_5$ and the dotted bond are as above;

with a compound of the formula:

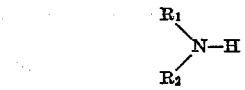
(IV)

wherein $R_1$ and $R_2$ are as above.

Another method for obtaining a compound of Formula I or II wherein $R_1$ is hydrogen is by reacting a compound selected from the group consisting of compounds of the formulas:

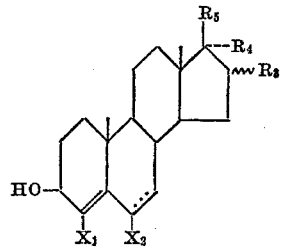
(Va)

and

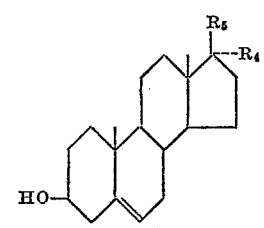
(Vb)

wherein $X_1$, $X_2$, $R_3$, $R_4$, $R_5$ and the dotted bond are as above;

with a compound of the formula:

$$R_2-N=C=O \qquad (VI)$$

wherein $R_2$ is as above.

Still another method for obtaining a compound of Formula I or II wherein $R_1$ and $R_2$ are hydrogen and/or wherein $R_5$ is

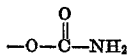

is by reacting a compound selected from the group consisting of compounds of the formulas:

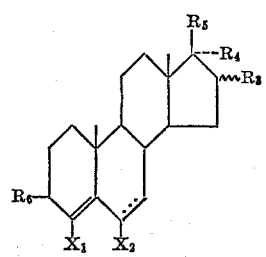
(VIIa)

and

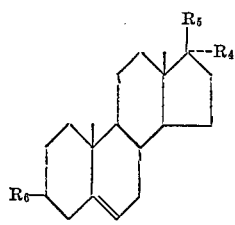

(VIIb)

wherein $R_6$ is hydroxy or

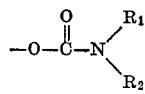

$\bar{X}_1$, $X_2$, $R_1$, $R_2$, $R_3$, $R_4$, $R_5$ and the dotted bond are as above; and at least one of $R_5$ and $R_6$ is hydroxy;

with sodium cyanate and trifluoroacetic acid.

The reaction of the compounds of Formula IIIa or IIIb with an amine of Formula IV can be suitably carried out in the presence of an inert organic solvent. Any conventional inert organic solvent such as diethyl ether or tetrahydrofuran can be utilized in this reaction. If desired, an excess of the liquid amine of Formula IV can also be suitably utilized as the solvent medium for the reaction. In carrying out this reaction, temperature and pressure are not critical, and in general, this reaction can be carried out at room temperature (25° C.) and at atmospheric pressure. In carrying out this reaction, temperatures higher or lower than room temperature can also be utilized, with the reflux temperature of the reaction mixture being preferred.

The reaction of the compounds of Formula Va or Vb with an isocyanate of Formula VI can be suitably carried out in the presence of a catalytic quantity of an organic amine base. In carrying out this reaction, any conventional organic amine base can be utilized, with pyridine, triethylamine and collidine being preferred. The reaction can also be suitably carried out in the presence of an inert organic solvent. Any conventional inert organic solvent may be utilized in this reaction such as benzene, diethyl ether or tetrahydrofuran. In carrying out this reaction, temperature and pressure are not critical, and in general, this reaction can be carried out at room temperature and at atmospheric pressure. In carrying out this reaction, temperatures higher or lower than room temperature can also be utilized.

The reaction of the compounds of Formula VIIa or VIIb with sodium cyanate and trifluoroacetic acid can be suitably carried out in the presence of an inert organic solvent. Any conventional inert organic solvent such as dichloromethane and tetrahydrofuran, can be utilized in this reaction. In carrying out this reaction, temperature and pressure are not critical and, in general, this reaction can be carried out at room temperature and at atmospheric pressure. In carrying out this reaction, temperatures of 0° C. to 30° C. are preferred, with 20° C. being particularly preferred.

The compounds of Formula IIIa or IIIb can be suitably obtained from the reaction of a compound of Formula Va or Vb with phenyl chloroformate. This reaction is preferably carried out in the presence of an organic amine which will react with and remove the HCl produced during the main reaction. In this reaction, any conventional organic amine base can be utilized, with pyridine, triethylamine and collidine being preferred. This reaction can also be carried out in the presence of an inert organic solvent. In this reaction, any conventional inert organic solvent may be utilized, with the aforementioned organic amine bases being preferred. In carrying out this reaction, temperature and pressure are not critical, and in general, the reaction can be suitably carried out at room temperature and atmospheric pressure. In carrying out this reaction, temperatures higher or lower than room temperature can also be utilized.

The compounds of Formula Va or Vb can be obtained by reducing a compound selected from the group consisting of compounds of the formulas:

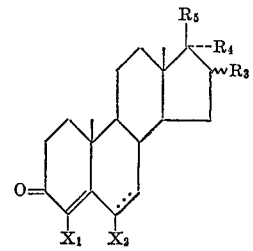

(VIIIa)

and

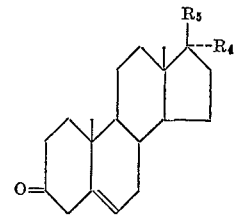

(VIIIb)

wherein $X_1$, $X_2$, $R_3$, $R_4$, $R_5$ and the dotted bond are as above.

The compounds of Formula VIIIa or VIIIb can be suitably reduced to the compounds of Formula Va or Vb by treatment with a reducing agent which selectively reacts with the 3-oxo substituent. In this reaction, any conventional, selective, 3-oxo reducing agent can be utilized with lithium tri-t-butoxyaluminum hydride being preferred. This reduction reaction can be suitably carried out in the presence of an inert organic solvent. In this reaction, any conventional inert organic solvent can be utilized, with diethyl ether and tetrahydrofuran being preferred. In this reaction, temperature and pressure are not critical, and in general, the reaction can be suitably carried out at room temperature and atmospheric pressure. In this reaction, temperatures higher or lower than room temperature can be utilized, with the reflux temperature of the reaction mixture being preferred.

The compounds of this invention, as well as the intermediates which are useful for their preparation, are characterized by endocrinological utility. Thus, the compounds of Formulas I and II, as well as IIIa and IIIb, can be administered internally, for example, orally or parenterally, with dosage adjusted to individual requirements, in the form of conventional pharmaceutical preparations. For example, the compounds of Formula I or II can be administered in conventional pharmaceutical solid or liquid forms, such as tablets, pills, capsules, solutions, suspensions, emulsions, or the like. These pharmaceutical preparations can contain the compounds of this invention as an active ingredient in concentrations of about 0.01% to 99% by weight. These pharmaceutical preparations can also contain conventional pharmaceutical carriers and excipients, such as water, talc, corn starch, polyalkylene glycols, emulsifying agents, buffering agents, agents for the adjustment of osmotic pressure, Vaseline and/or the like. Though it is preferred to administer the endocrinologically useful compounds of this invention internally, the progestationally useful compounds of Formulas I and II above can be administered topically. For this purpose, i.e., topical administration, these compounds can be administered in conventional topical administration forms, such as ointments or creams, in combination with conventional topical carriers such as petrolatum, stearic acid or the like. Also compositions containing an active ingredient of this invention can be subjected to conventional pharmaceutical processes such as sterilization or the like. Also, the pharmaceutical compositions of this invention can contain other active ingredients. Moreover, these endocrinologically active compounds can be administered as feed additives, and for this purpose can be admixed with conventional animal feeds or conventional animal premixes. Though as indicated, dosages of the endocrinologically useful compounds of this invention should be adjusted to individual needs, the compounds of this invention can be administered internally in daily dosage regimens of from about 0.005 mg./kg. to about 0.15 mg./kg. per day. These dosages can be administered in unit or divided dosage forms.

The pregnane compounds of this invention exhibit useful progestational activity as indicated in animals. For example, the progestational compounds of this invention, when administered to estrogen primed immature female rabbits for five days show the presence of progestational activity by a secretory type endometrial response observed on histological sections prepared from the rabbits' uteri and examined microscopically. The following compounds, when administered in the manner set forth above, showed progestational activity at subcutaneous dosages of less than 10 µg./day:

6-chloro-3β,17α-dihydroxypregna-4,6-dien-20-one
   3-carbamate 17-acetate;
6-chloro-3β,17α-dihydroxypregna-4,6-dien-20-one
   3-dimethylcarbamate 17-acetate;
6-chloro-3β,17α-dihydroxypregna-4,6-dien-20-one
   3-ethylcarbamate 17-acetate; and
4,6-dichloro-3β,17α-dihydroxypregna-4,6-dien-20-one
   3-carbamate 17-acetate.

The androstane compounds of this invention exhibit useful androgenic and/or anabolic activity. For example, the androgenic and/or anabolic activity of compounds of this invention is shown in a procedure wherein five castrated rats weighing approximately 40-50 g. each are given either oral dosages or subcutaneous injections of the compound suspended in sesame oil, whereas a control group of five rats is administered the sesame oil vehicle only. After seven days of treatment all animals are autopsied and weights of their ventral prostates and levator ani muscles are determined. The weight of their levator ani as compared to the control group of rats is the criterion used for determining anabolic activity. The weight of their ventral prostates as compared to the control group of rats is the criterion used for determining androgenic activity. The following compounds, when administered in the manner set forth above, showed androgenic and/or anabolic activity at dosages of 1.0 mg./day per os:

17α-methylandrost-4-ene-3β,17β-diol 3-ethylcarbamate;
17α-methylandrost-4-ene-3β,17β-diol 3-methylcarbamate;
17α-methylandrost-4-ene-3β,17β-diol 3-allylcarbamate;
17α-methylandrost-4-ene-3β,17β-diol 3-butylcarbamate;
androst-4-ene-3β,17β-diol 3-ethylcarbamate 17-acetate;
17α-methylandrost-5-ene-3β,17β-diol 3-phenylcarbamate;
17α-methylandrost-5-ene-3β,17β-diol bis-carbamate; and
androst-5-ene-3β,17β-diol 3-ethylcarbamate 17-acetate.

The pregnane compounds of this invention also exhibit useful anti-estrogenic activity as indicated in animals. For example, the anti-estrogenic activity of the compounds of this invention is shown in a procedure wherein groups of ten immature female rats are given once a day, for three days, an oral dose of the compound concurrently with a subcutaneous injection of 0.1 µg. of estradiol in sesame oil. On the fourth day, the uteri are removed at autopsy and weighed. The weights of the uteri compared to those of a control group of rats is the criterion used for determining anti-estrogenic activity. The following compounds, when administered subcutaneously in the manner set forth above, showed antiestrogenic activity at dosages of 500 µg./day:

6-chloro-3β,17α-dihydroxypregna-4,6-dien-20-one
   3-carbamate 17-acetate;
6-chloro-3β,17α-dihydroxypregna-4,6-dien-20-one
   3-dimethylcarbamate 17-acetate;
6-chloro-3β,17α-dihydroxypregna-4,6-dien-20-one
   3-ethylcarbamate 17-acetate; and
4,6-dichloro-3β,17α-dihydroxypregna-4,6-dien-20-one
   3-carbamate 17-acetate.

The androstane compounds of this invention exhibit useful antigonadotropic activity as indicated in animals. For example, the antigonadotropic activity of the compounds of this invention is shown in a procedure wherein the compounds are administered for ten days to immature male rats. At autopsy, the testes, seminal vesicles and ventral prostates are removed and then respective weights determined. The weights of these organs as compared with the control groups of rats is the criterion used for determining the antigonadotropic activity. The following compounds, when administered in the manner set forth above, showed antigonadotropic activity at dosages of 1.0 mg./day per os:

17α-methylandrost-4-ene-3β,17β-diol 3-ethylcarbamate;
17α-methylandrost-4-ene-3β,17β-diol 3-methylcarbamate;
17α-methylandrost-4-ene-3β,17β-diol 3-allylcarbamate;
androst-4-ene-3β,17β-diol 3-ethylcarbamate 17-acetate; and
17α-methylandrost-5-ene-3β,17β-diol 3-ethylcarbamate.

The examples which follow illustrate the invention. All temperatures are in degrees centigrade.

EXAMPLE 1

3β,17α-dihydroxypregn-4-en-20-one-3-carbamate-17-acetate

To a solution of 3.74 g. (0.01 mole) of 3β,17α-dihydroxypregn-4-en-20-one 17-acetate in 5 ml. of dry pyridine was added 2.5 ml. of phenyl chloroformate. A gummy precipitate soon formed and after an additional 10 ml. of pyridine was added the precipitate gradually solidified. The solid was broken up and the slurry was stirred at room temperature for nine days. The reaction was then poured with stirring into 600 ml. of ice and water. The resulting 3β,17α-dihydroxypregn-4-en-20-one 3-phenylcarbonate 17-acetate precipitate was collected by filtration, washed with water and dissolved in a mixture of diethyl ether and tetrahydrofuran. The organic layer was dried and concentrated to a final volume of 75 ml. Fifteen milliliters of this solution (corresponding to 750 mg. of the pregnane starting material) was added dropwise to 15 ml. of liquid ammonia (−33° C.) and the resulting solution was allowed to reflux for 3.5 hr. The ammonia was allowed to evaporate overnight and the residual solution was poured into 500 ml. of ice and water. The resulting gummy precipitate was collected by filtration and dissolved in dichloromethane. The solution was dried and concentrated and the residue was recrystallized several times from diethyl ether-hexane to give 3β,17α-dihydroxypregn-4-en-20-one 3-carbamate 17-acetate as colorless crystals; melting point (M.P.) 216° (dec.).

EXAMPLE 2

6-chloro-3β,17α-dihydroxypregna-4,6-dien - 20 - one 3-carbamate 17-acetate

To a vigorously stirred solution of 1.23 g. (3.0 mmoles) of 6-chloro-3β,17α-dihydroxypregna-4,6-diene-20-one 17-acetate in 37 ml. of pyridine at room temperature was added 1.05 ml. of phenyl chloroformate. After stirring for 2 hrs. the reaction mixture was poured into 1 l. of ice and water. The resulting 6 - chloro - 3β,17-α-dihydroxypregna-4,6-dien-20-one 3-phenylcarbonate 17-acetate precipitate was collected by filtration and dissolved in diethyl ether. The solution dried and concentrated and the phenylcarbonate residue was dissolved in 50 ml. of tetrahydrofuran. One half of this solution was added dropwise to 25 ml. of liquid ammonia at reflux temperature and after stirring for 1.5 hrs. the excess ammonia was allowed to evaporate. The residue was poured into 1 l. of ice and water. The resulting precipitate was collected by filtration and dissolved in diethyl ether, and this solution was then dried and concentrated. The resulting yellow oil was crystallized and recrystallized from methanol to give 6-chloro-3β,17-α-dihydroxypregna - 4,6 - dien - 20 - one 3-carbamate 17-acetate as colorless crystals; M.P. 213–215° (dec.).

EXAMPLE 3

6-chloro-3β,17α-dihydroxypregna-4,6-dien-20-one 3-dimethylcarbamate 17-acetate

To 25 ml. of dimethylamine cooled to —70° C. was added a solution of the phenylcarbonate prepared, as in Example 2, from 0.615 g. (1.5 mmoles) of 6-chloro-3β, 17α-dihydroxypregna-4,6-dien - 20 - one 17-acetate and 0.525 ml. of phenyl chloroformate, in 25 ml. of tetrahydrofuran. After stirring at —70° for one hour, the reaction was allowed to warm to room temperature, and excess dimethylamine was allowed to evaporate overnight. The residue was diluted with dichloromethane and diethyl ether, washed with water, dried and concentrated to an oil which was crystallized from diethyl ether and recrystallized from dichloromethane-methanol to give 6-chloro-3β,17α-dihydroxypregna - 4,6 - dien-20-one 3 - dimethylcarbamate 17-acetate as colorless crystals; M.P. 243–244° (dec.).

EXAMPLE 4

6-chloro-3β,17α-dihydroxypregna-4,6-dien-20-one 3-ethylcarbamate 17-acetate

To a solution of 0.30 g. (0.74 mmole) of 6-chloro-3β, 17α-dihydroxypregna-4,6-dien-20-one 17-acetate in 15 ml. of benzene, containing three drops of pyridine, was added in several portions over 8 days, 16.5 ml. of ethyl isocyanate. The solution was stirred for an additional 6 days and then shaken with 300 ml. of ice and water. The aqueous layer was extracted three times with diethyl ether and the combined organic layers were washed with water, dried and concentrated. The residue was crystallized from diethyl ether-hexane and recrystallized from methanol-water to give 6-chloro-3β,17α-dihydroxypregna-4,6-dien-20-one 3-ethylcarbamate 17-acetate as colorless crystals; M.P. 220–221° (dec.).

EXAMPLE 5

4,6-dichloro-3β,17α-dihydroxypregna-4,6-dien-20-one 3-carbamate 17-acetate

To a vigorously stirred solution of 0.50 g. (1.13 mmoles) of 4,6-dichloro - 3β,17α - dihydroxypregna-4,6-dien-20-one 17-acetate in 15 ml. of pyridine at room temperature was added 0.28 ml. of phenyl chloroformate. The reaction was stirred overnight, an additional 0.14 ml. of phenyl chloroformate was added and the reaction was stirred overnight again. It was then poured into 450 ml. of ice and water. The resulting 4,6-dichloro-3β,17α-dihydroxypregna-4,6-dien-20-one 3-phenylcarbonate 17-acetate precipitate was collected by filtration and dissolved in 30 ml. of tetrahydrofuran. The solution was dried and concentrated at room temperature to 15 ml. This phenylcarbonate solution was then added dropwise to 15 ml. of refluxing ammonia. The reaction was stirred and allowed to reflux for 2½ hrs. and then the ammonia was poured into 500 ml. of ice and water and the resulting precipitate was collected by filtration and dissolved in dichloromethane. The solution was dried and concentrated. The residue was crystallized from methanol to give 4,6-dichloro3β, 17α-dihydroxypregna-4,6 - dien - 20-one 3-carbamate 17-acetate as colorless crystals; M.P. 265–267° (dec.).

EXAMPLE 6

4,6-dichloro-3β,17α-dihydroxy-16-methylenepregna-4,6-dien-20-one 3-dimethylcarbamate 17-acetate To a solution of 0.500 g. (1.10 mmoles) of 4,6-dichloro-3β,17α-dihydroxy - 16 - methylenepregna-4,6-dien-20-one 17-acetate in 15 ml. of pyridine was added 0.81 ml. of phenyl chloroformate. A precipitate formed immediately which was initially gummy but which soon was crystalline. After the reaction had been stirred at ambient temperature for 1.5 hrs., it was poured into 200 ml. of ice and water. The resulting 4,6-dichloro - 3β,17α - dihydroxy-16-methylenepregna-4,6-dien - 20 - one 3 - phenylcarbonate 17-acetate precipitate was collected by filtration and dissolved in dichloromethane. The solution was dried and concentrated to give a residue containing the crude phenylcarbonate. This was dissolved in 20 ml. of tetrahydrofuran and added dropwise to 20 ml. of diethylamine cooled in a Dry Ice bath. The reaction was then stirred at room temperature under a Dry Ice condenser for 3 hrs. The excess dimethylamine was allowed to evaporate overnight and the remaining solvent was removed under vacuum. The residue was dissolved in benzene, and the solution was washed with 1 N hydrochloric acid and with water, dried, and evaporated to a yellow oil. This was oiled out of diethyl ether-hexane several times and finally crystallized. Recrystallization from diethyl ether-hexane gave 4,6-dichloro-3β,17α-dihydroxy - 16 - methylenepregna - 4,6 - dien-20-one 3-dimethylcarbamate 17-acetate as colorless crystals; M.P. 162–164° C.

EXAMPLE 7

17α-methylandrost-4-ene-3β,17β-diol 3-ethylcarbamate

A mixture of 3.00 g. (0.0098 mole) of 17α-methylandrost-4-ene-3β,17β-diol, 30 ml. of dry benzene, 2.6 ml. of ethyl isocyanate and 2 drops of pyridine was stirred at 50° for 3 days. Another 1.3 ml. of ethyl isocyanate was added and heating was continued one more day. The cooled reaction was poured into ice water and extracted with dichloromethane. The extracts were washed with water, dried and evaporated. The residue was crystallized from methanol and the solid product was adsorbed onto a column of silica gel from benzene. Elution with diethyl ether and crystallization from dichloromethane-hexane gave 17α-methylandrost - 4 - ene-3β,17β,diol 3-ethylcarbamate as colorless crystals; M.P. 137–140.5°.

EXAMPLE 8

17α-methylandrost-4-ene-3β-diol 3-ethylcarbamate

A solution of 5.00 g. (0.0164 mole) of 17α-methylandrost-4-ene-3β,17β-diol, 4.5 ml. of ethyl isocyanate and 5 drops of pyridine in 250 ml. of tetrahydrofuran was allowed to stand at room temperature. After 3 weeks about 15 mg. of sodium methoxide was added and 11 weeks later the reaction was poured into 2.5 l. of ice and water containing 40 ml. of concentrated ammonium filtration, washed well with water and dissolved in dichloromethane. The solution was washed twice with water, dried and concentrated to a colorless foam. This was crystallized from diethyl ether-hexane and recrystallized from dichloromethane-hexane to give 17α-methylandrost-4-ene-3β,17β-diol 3-ethylcarbamate as colorless crystals; M.P. 137–139°.

EXAMPLE 9

17α-methylandrost-4-ene-3β,17β-diol 3-phenylcarbonate

To a vigorously stirred solution of 15.00 g. (0.049 mole) of 17α-methylandrost-4-ene-3β,17β-diol in 600 ml. of pyridine was added over 30 min. 17.1 ml. of phenyl chloroformate. The reaction was stirred at room temperature for 2.75 hrs. and then poured into 8 l. of ice and water. The resulting precipitate was collected by filtration, washed with water, and dissolved in diethyl ether containing a little dichloromethane. The solution was dried over sodium sulfate and concentrated to give a colorless oil which was diluted to 250 ml. with tetrahydrofuran to give a stock solution of 17α-methylandrost-4-ene-3β,17β-diol 3-phenylcarbonate. Fifty milliliters of this stock solution was diluted with 50 ml. of tetrahydrofuran and mixed with 15 ml. of diethylamine. After standing at room temperature for 3 days, tlc indicated no reaction had taken place and the phenylcarbonate was recovered by pouring the reaction into 500 ml. of ice and water. The resulting solid was dissolved in diethylether, dried over sodium sulfate, filtered over a short column of silica gel and concentrated. The residue was recrystallized from diethyl ether-hexane to give 17α-methylandrost-4-ene-3β,17β-diol 3-phenylcarbonate as colorless crystals; M.P. 140.5–142.5°.

EXAMPLE 10

17α-methylandrost-4-ene-3β,17β-diol 3-methylcarbamate

To a solution of 15 ml. of methylamine in 50 ml. of dioxane cooled to −70° was added a solution of the crude 17α-methylandrost-4-ene-3β,17β-diol 3-phenylcarbonate prepared as in Example 9 from 3.00 g. (9.8 mmoles) of 17α-methylandrost-4-ene-3β,17β-diol in 50 ml. of dioxane. The solution was stirred at −70° C. for one hour and then at room temperature (∼25° C.) overnight. Most of the dioxane was removed under vacuum and the residue was mixed with 250 ml. of ice and water. The resulting oil was isolated by decantation and dissolved in dichloromethane. The solution was dried and concentrated under vacuum. The residue was dissolved in hexane and adsorbed onto a silica gel column. Elution with 15% diethyl ether in hexane removed less polar impurities and elution with diethyl ether gave material rich in product. Recrystallization from diethyl ether-hexane gave 17α-methylandrost-4-ene-3β,17β-diol 3 - methylcarbamate as colorless crystals, M.P. 97–102° C. with resolidification and remelting at 155.5–157.5° C.

EXAMPLE 11

17α-methylandrost-4-ene-3β,17β-diol 3-methylcarbamate

Treatment of 17α-methylandrost-4-ene-3β,17β-diol with methyl isocyanate, according to the procedure of Example 8, gave 17α-methylandrost-4-ene-3β,17β-diol 3-methylcarbamate as colorless crystals; M.P. 96–102°; with resolidification and remelting at M.P. 154–156°.

EXAMPLE 12

17α-methylandrost-4-ene-2β,17β-diol 3-allylcarbamate

Treatment of 17α-methylandrost-4-ene-3β,17β-diol with allyl isocyanate, according to the procedure of Example 8, gave after recrystallization from dichloromethane-diethyl ether-hexane 17α-methylandrost-4-ene-3β,17β-diol 3-allylcarbamate; M.P. 141–142°.

EXAMPLE 13

17α-methylandrost-4-ene-3β,17β-diol 3-butylcarbamate

Treatment of 17α-methylandrost-4-ene-3β,17β-diol with butyl isocyanate, according to the procedure of Example 8, gave after recrystallization from dichloromethane-diethyl ether 17α-methylandrost-4-ene-3β,17β-diol 3-butylcarbamate as colorless crystals; M.P. 158–159.5° C.

EXAMPLE 14

17α-methylandrost-5-ene-3β,17β-diol bis-carbamate

To a slowly stirred slurry of 15.81 g. (0.052 mole) of 17α-methylandrost-5-ene-3β,17β-diol and 6.75 g. (0.104 mole) of sodium cyanate in 24 ml. of dichloromethane cooled to 20° was added over one hour 8.52 ml. (0.105 mole) of trifluoroacetic acid. The reaction was stirred overnight at room temperature, diluted with dichloromethane and washed 4 times with water. The solution of 17α-methylandrost - 5 - ene-3β,17β-diol 3-carbamate and 17α-methylandrost-5-ene-3β,17β - diol bis-carbamate was dried and concentrated to give a crystalline residue. This was repeatedly recrystallized from dichloromethane to give the bis-carbamate as colorless crystals; M.P. 255–259°.

EXAMPLE 15

17α-methylandrost-5-ene-3β,17β-diol 3-ethylcarbamate

A solution of 10.7 g. (0.035 mole) of 17α-methylandrost-5-ene—3β,17β-diol and 25 g. (0.35 mole) of ethyl isocyanate in 200 ml. of tetrahydrofuran containing 5 drops of pyridine was allowed to stand at room temperature for 41 days. It was then poured into 2 l. of ice and water containing 45 ml. of concentrated ammonium hydroxide. The resulting precipitate was collected by filtration and dissolved in dichloromethane. The solution was dried and concentrated to a pale yellow oil which was crystallized from diethyl ether-hexane. Recrystallization from dichloromethane-hexane then from methanol-water and finally from dichloromethane-hexane gave 17α-methylandrost-5-ene-3β,17β-diol 3-ethylcarbamate was colorless crystals; M.P. 170–172°.

EXAMPLE 16

17α-methylandrost-5-ene-3β,17β-diol 3-phenylcarbamate

An initially heterogeneous mixture of 5.00 g. (0.0164 mole) of 17α-methylandrost-5-ene-3β,17β-diol, 6.5 ml., (7.1 g., 0.059 mole) of phenyl isocyanate, 50 ml. of benzene, 10 ml. of dioxane and 3 drops of pyridine were stirred at room temperature for 3 days. The reaction was then stirred with 500 ml. of ice and water for 1.5 hours and extracted with dichloromethane. The solution was dried and concentrated. The partly crystalline residue was triturated with dichloromethane to remove some insoluble diphenylurea and the solution was concentrated with the simultaneous addition of hexane to give crude crystalline product. This was recrystallized from diethyl ether-hexane to give 17α-methylandrost-5-ene-3β,17β-diol 3-phenylcarbamate as colorless crystals; M.P. 203.5–206.5°.

EXAMPLE 17

Androst-4-ene-3β,17β-diol 3-ethylcarbamate 17-acetate

To a solution of 50.0 g. (0.15 mole) of testosterone acetate in 250 ml. of absolute ethanol cooled in an ice bath was added 4.5 g. of sodium borohydride. After 45 min. another 0.45 g. of sodium borohydride was added and 10 min. later 7.8 ml. of acetic acid was added. After the initial foaming had subsided the reaction mixture was poured into a 2 l. of ice and water. The resulting precipitate was collected by filtration and dissolved in dichloromethane. The solution was dried and concentrated and the residue was crystallized from dichloromethane-diethyl ether and then recrystallized from diethyl ether to give a mixture of alcohols of M.P. 149–152°, containing androst-4-ene-3β,17β-diol 17-acetate.

A solution of 5.00 g. of the above 149–152° mixture of alcohols, 30 ml. of benzene, 20 ml. of tetrahydrofuran, 3 drops of pyridine and 8.0 ml. of ethyl isocyanate was allowed to stand at room temperature for 18 days. The reaction was then stirred with 1 l. of ice and water for one hour and extracted with dichloromethane. The extracts were dried and concentrated and the residue was recrystallized from dichloromethane-diethyl ether-hexane to give androst-4-ene-3β,17β-diol 3-ethylcarbamate 17-acetate as colorless crystals; M.P. 179–181°.

EXAMPLE 18

3β-hydroxyandrost-5-en-17-one ethylcarbamate

A solution of 12.68 g. (0.044 mole) of 3β-hydroxyandrost -5-en-17-one, 25 g. (0.35 mole) of ethyl isocyanate and 5 drops of pyridine in 60 ml. of tetrahydrofuran was stirred at room temperature for 14 days. It was then poured into one liter of ice and water containing 42 ml. of concentrated ammonium hydroxide. The resulting precipitate was collected by filtration and dissolved in dichloromethane. The solution was washed twice with water, dried and evaporated to give a colorless crystalline residue. Recrystallization from dichloromethane-ethyl acetate gave 3β-hydroxyandrost-5-en-17-one ethylcarbamate; M.P. 181.5–183°.

EXAMPLE 19

Androst-5-ene-3β,17β-diol 3-ethylcarbamate

To a solution of 10.60 g. (0.0295 mole) of 3-hydroxy-androst-5-en-17-one ethylcarbamate in 106 ml. of tetrahydrofuran was added 106 ml. of ethanol followed by 1.06 g. (0.28 mole) of sodium borohydride. The reaction was stirred at room temperature for 90 min. and poured into 2 l. of ice and water. The resulting precipitate was collected by filtration and dissolved in dichloromethane. The solution was washed with water, dried and evaporated to give a colorless crystalline residue. This was recrystallized from dichloromethane-ethyl acetate to give androst-5-ene-3β-17β-diol 3-ethylcarbamate; M.P. 201–202° C.

EXAMPLE 20

Androst-5-ene-3β,17β-diol 3-ethylcarbamate 17-acetate

A solution of 3.00 g. (0.0083 mole) of androst-5-ene-3β,17β-diol 3-ethylcarbamate in 15 ml. of pyridine and 15 ml. of acetic anhydride was stirred at room temperature for 7 hr. and poured into 1 l. of ice and water. The resulting precipitate was collected by filtration and dissolved in dichloromethane. The solution was washed three times with a 5% (by weight) aqueous solution of sodium bicarbonate, dried and evaporated to leave a residue of colorless crystals. Recrystallization from dichloromethane-diethyl ether gave androst-5-ene-3β-17β-diol 3-ethylcarbamate 17-acetate; M.P. 171–173° C.

EXAMPLE 21

4,6-dichloro-17α-hydroxypregna-4,6-diene-3,20-dione acetate

To a cold (0°) solution of 1.0160 g. of 6-chloro-17α-hydroxypregna-4,6-dien-3,20-dione acetate in 10 ml. of alcohol-free chloroform was rapidly added (at 0°) 3.4 ml. of a 0.817 M solution of $Cl_2$ in dry carbon tetrachloride. This solution was stored at 0° for 18 hrs. The solvent was then removed under reduced pressure and the residue was treated with 25 ml. of heptane and the solvent was again removed under reduced pressure. This operation was repeated a second time. The residue was then treated with 4 ml. of dry pyridine and the resulting solution was heated on a steam bath for 5 minutes. The solution was then allowed to stand at room temperature overnight (pyridine hydrochloride precipitated from the reaction mixture). To the pyridine solution was then added 50 ml. of chloroform and the resulting solution was twice extracted, each time with 50 ml. of 1 N hydrochloric acid. The aqueous layer was then extracted with 25 ml. of ether. The organic layers were combined, dried over magnesium sulfate and evaporated under reduced pressure. The residue was treated with 25 ml. of heptane which was evaporated under reduced pressure. This operation was repeated a second time giving crude 4,6-dichloro-17α-hydroxypregna-4,6-diene-3,20-dione acetate which was recrystallized twice from dichloromethaneethyl acetate yielding crystals; M.P. 241–243°.

EXAMPLE 22

4,6-dichloro-3β,17α-dihydroxypregna-4,6-dien-20-one 17-acetate

A solution of 2.000 g. of 4,6-dichloro-3β,17α-hydroxypregna-4,6-diene-3,20-dione acetate in 20 ml. of anhydrous tetrahydrofuran was added dropwise over a 15 minute period to 3.280 g. of lithium tri-t-butoxyaluminum hydride in 20 ml. of anhydrous tetrahydrofuran under a nitrogen atmosphere. After stirring at room temperature for 2 hours, 20 ml. of acetone was added followed by 150 ml. of 10% acetic acid in water. The mixture was extracted with two 75 ml. portions of chloroform, the organic layers were combined, washed with 5% sodium bicarbonate, dried with magnesium sulfate and concentrated under reduced pressure. The crude solid was crystallized from acetone-hexane which upon recrystallization from the same solvent system yielded 4,6-dichloro-3β,17α-dihydroxypregna-4,6-dien-20-one 17-acetate; M.P. 255–257°.

EXAMPLE 23

4,6-dichloro-17α-hydroxy-16-methylenepregna-4,6-diene-3,20-dione acetate

To a solution of 3.9 g. of 6-chloro-17α-hydroxy-16-methylenepregna-4,6-diene-3,20-dione acetate in 25 ml. of alcohol-free chloroform was added dropwise (at 0°) 11.3 ml. (5% excess) of a 0.87 molar solution of chlorine in carbon tetrachloride. The resultant solution was stirred for one hour at 0° and the solvents were then removed under reduced pressure. The resulting foam was treated with 10 ml. of dry pyridine and then stirred at room temperature for 2 hours. Diethyl ether (200 ml.) was added and the mixture was twice extracted, each time with 150 ml. of 1 N hydrochloric acid. The diethyl ether solution was then dried and the solvent was removed under reduced pressure. The residue was triturated with diethyl ether to give a material which was chromatographed on silica gel. Elution with 2% ethyl acetate-benzene gave 2α,4,6-trichloro-17α-hydroxy-16-methylenepregna-4,6-diene-3,20-dione acetate which upon crystallization from dichloromethane/diethyl ether melted at 235–238° d. (dec. begins 225°).

Further elution with 5% ethyl acetate-benzene gave 4,6-dichloro-17α-hydroxy - 16 - methylenepregna - 4,6 - diene-3,20-dione acetate which upon crystallization from dichloromethane-diethyl ether melted at 218–219°.

EXAMPLE 24

4,6-dichloro-3β,17α-dihydroxy-16-methylenepregna-4,6-dien-20-one 17-acetate

To a solution of 0.5 g. of 4,6-dichloro-17α-hydroxy-16-methylenepregna-4,6-diene-3,20-dione acetate in 10 ml. of dry tetrahydrofuran was added dropwise a solution of 1.3 g. of lithium tri-t-butoxyaluminum hydride in 10 ml. of dry tetrahydrofuran. After stirring for 2 hours at room temperature the solution was cooled in an ice bath and 1.0 ml. of acetone was added. After 15 minutes the solution was poured into 150 ml. of chloroform and the chloroform solution was twice extracted, each time with 125 ml. of an aqueous solution of 10% acetic acid (by weight), then with an aqueous solution of 5% sodium bicarbonate (by weight). The aqueous washings were combined and extracted with diethyl ether. The combined organic layers were dried and the solvent was removed under reduced pressure giving 4,6-dichloro-3β,17α-dihydroxy-16-methylenepregna-4,6-dien-20-one 17-acetate which upon crystallization from dichloromethane-diethyl ether melted at 220–222° C.

EXAMPLE 25

Tablets of the following formulation were prepared as described below:

| | Mg. per tablet |
|---|---|
| 3β,17α-dihydroxypregn-4-en - 20 - one 3-carbamate 17-acetate | 2.55 |
| Dicalcium phosphate, unmilled | 232.45 |
| Corn starch | 12.50 |
| Magnesium stearate | 2.50 |
| Total weight | 250.00 |

The 3β,17α-dihydroxypregn-4-en - 20 - one 3-carbamate 17-acetate and corn starch were blended in a suitable size mixer. The mix was then blended with an equal quantity of dicalcium phosphate. The mixture was blended for five minutes with the balance of the dicalcium phosphate and magnesium stearate. The mixture was then compressed.

EXAMPLE 26

Suppositories of the following formulation were prepared as described below:

| | Mg. per 1.3 gm. suppository |
|---|---|
| 3β,17α-dihydroxypregn-4-en-20-one 3-carbamate 17-acetate | 0.005 |
| Wecobee M [1] | 1.250 |
| Carnauba Wax | 0.045 |

The Wecobee M and the carnauba wax were melted in a suitable size glass lined container, mixed well and cooled to 45° C. 3β,17α-dihydroxypregn-4-en-20-one 3-carbamate 17-acetate, which had been reduced to a fine powder with no lumps, was added and stirred until completely and uniformly dispersed. The mixture was poured into suppository molds to yield suppositories having an individual weight of 1.3 gms. The suppositories were cooled and removed from molds. They were individually wrapped in wax paper for packaging.

EXAMPLE 27

Capsules of the following formulation were prepared as follows:

| | Mg. per capsule |
|---|---|
| 3β,17α-dihydroxypregn-4-en-20-one 3-carbamate 17-acetate | 5 |
| Lactose | 178 |
| Corn starch | 37 |
| Talc | 5 |
| Total weight | 225 |

3β,17α-dihydroxypregn-4-en-20-one 3-carbamate 17-acetate was mixed with the lactose and corn starch in a suitable mixer. The mixture was further blended by passing through a Fitzpatrick comminuting machine with a #1A screen with knives forward. The blended powder was returned to the mixer, the talc added and blended thoroughly. The mixture was then filled into #4 hard shell gelatin capsules on a Parke Davis capsulating machine.

EXAMPLE 28

A 0.1% cream of the following formulation was prepared as follows:

| | Mg. per gram |
|---|---|
| 3β,17α-dihydroxypregn-4-en-20-one 3-carbamate 17-acetate | 1.00 |
| Stearyl alcohol | 100.00 |
| Cetyl alcohol | 15.00 |
| White petrolatum | 70.00 |
| Methyl parahydroxybenzoate, U.S.P. | 2.00 |
| Propyl parahydroxybenzoate, U.S.P. | 0.50 |
| Isopropyl palmitate | 60.00 |
| Polyoxyl 40 stearate, U.S.P. | 40.00 |
| Propylene glycol | 120.00 |
| Disodium versenate | 0.10 |
| Distilled water | 597.16 |

The stearyl alcohol, cetyl alcohol, petrolatum, propyl parahydroxybenzoate, isopropyl palmitate and polyoxyl 40 stearate were melted at 75° C. The mixture was cooled to and maintained at 70° C. Disodium versenate and methyl parahydroxybenzoate were dissolved in hot distilled water to which was added the propylene glycol. The solution was mixed at 75° C. and slowly added to the oil solution prepared previously, using slow agitation. The emulsion was gradually cooled with slow stirring. When the temperature of the ointment reached 55° C., 3β,17α-dihydroxypregn-4-en-20-one 3-carbamate 17-acetate was added and mixed with the ointment. When the temperature of the ointment reached 50° C., cold water was circulated in the jacket of the kettle and the ointment was cooled to 30° C. with stirring. The ointment was then transferred to storage containers.

EXAMPLE 29

A tablet of the following formulation was prepared as described in Example 25:

| | Mg. per tablet |
|---|---|
| 6-chloro-3β,1α-dihydroxyprepgna-4,6-diene-20-one 3-dimethylcarbamate 17-acetate | 2.55 |
| Dicalcium phosphate, unmilled | 232.45 |
| Corn starch | 12.50 |
| Magnesium stearate | 2.50 |
| Total weight | 250.00 |

EXAMPLE 30

A suppository of the following formulation was prepared as described in Example 26:

| | Gm. per 1.3 gm. suppository |
|---|---|
| 6-chloro-3β,17α-dihydroxypregna-4,6-dien-20-one 3-dimethylcarbamate 17-acetate | 0.005 |
| Wecobee M | 1.250 |
| Carnauba wax | 0.045 |

EXAMPLE 31

A capsule of the following formulation was prepared as described in Example 27:

| | Mg. per capsule |
|---|---|
| 6-chloro-3β,17α-dihydroxypregna-4,6-dien-20-one 3-dimethylcarbamate 17-acetate | 5 |
| Lactose | 178 |
| Corn starch | 37 |
| Talc | 5 |
| Total weight | 225 |

EXAMPLE 32

A 0.1% cream of the following formulation was prepared as described in Example 28:

| | Mg. per gram |
|---|---|
| 6-chloro-3β,17α-dihydroxypregna-4,6-dien-20-one 3-dimethylcarbamate 17-acetate | 1.00 |
| Stearyl alcohol | 100.00 |
| Cetyl alcohol | 15.00 |
| White petrolatum | 70.00 |
| Methyl parahydroxybenzate, U.S.P. | 2.00 |
| Propyl parahydroxybenzoate, U.S.P. | 0.50 |
| Isopropyl palmitate | 60.00 |
| Polyoxyl 40 stearate, U.S.P. | 40.00 |
| Propylene glycol | 120.00 |
| Disodium versenate | 0.10 |
| Distilled water | 597.16 |

EXAMPLE 33

A tablet of the following formulation was prepared as described in Example 25:

| | Mg. per tablet |
|---|---|
| 17α-methylandrost-5-ene-3β,17β-diol bis-carbamate | 2.55 |
| Dicalcium phosphate, unmilled | 232.45 |
| Corn starch | 12.50 |
| Magnesium stearate | 2.50 |
| Total weight | 250.00 |

EXAMPLE 34

A suppository of the following formulation was prepared as described in Example 26:

| | Gm. per 1.3 gm. suppository |
|---|---|
| 17α-methylandrost-5-ene-3β,17β-diol bis-carbamate | 0.005 |
| Wecobee M | 1.250 |
| Carnauba wax | 0.045 |

EXAMPLE 35

A capsule of the following formulation was prepared as described in Example 27:

| | Mg. per capsule |
|---|---|
| 17α-methylandrost-5-ene-3β,17β-diol bis-carbamate | 5 |
| Lactose | 178 |
| Corn starch | 37 |
| Talc | 5 |
| Total weight | 225 |

EXAMPLE 36

A 0.1% cream of the following formulation was prepared as described in Example 28:

| | Mg. per gram |
|---|---|
| 17α-methylandrost-5-ene-3β,17β-diol bis - carbamate | 1.00 |
| Stearyl alcohol | 100.00 |
| Cetyl alcohol | 15.00 |
| White petrolatum | 70.00 |
| Methyl parahydroxybenzoate, U.S.P. | 2.00 |
| Propyl parahydroxybenzoate, U.S.P. | 0.50 |
| Isopropyl palmitate | 60.00 |
| Polyoxyl 40 stearate, U.S.P. | 40.00 |
| Propylene glycol | 120.00 |
| Disodium versenate | 0.10 |
| Distilled water | 597.16 |

I claim:

1. A compound selected from the group consisting of compounds of the formulas:

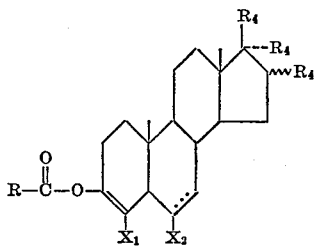

and

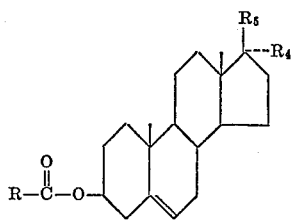

wherein R is

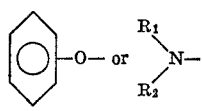

$X_1$ and $X_2$ are halogen or hydrogen; $R_1$ and $R_2$ are hydrogen, lower alkyl, lower alkenyl or aryl; $R_3$ is hydrogen, lower alkyl or lower alkylidene; $R_4$ is individually hydrogen, lower alkyl, hydroxy or lower alkanoyloxy; $R_5$ is individlually hydroxy, acetyl, lower alkanoyloxy or

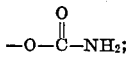

and the dotted bond is a single bond or a double bond between carbon atoms in the 6 and 7 position; with the proviso that when $R_5$ is

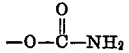

hydroxy or lower alkanoyloxy, $R_4$ is hydrogen or lower alkyl and wherein $R_5$ is acetyl, $R_4$ is hydroxy or lower alkanoyloxy; and with the further proviso that when $X_1$ and $X_2$ are hydrogen, the dotted bond is a single bond.

2. The compound of claim 1 having the formula:

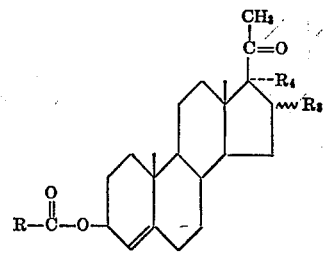

wherein $R_3$, $R_4$ and R are as above.

3. The compound of claim 2 wherein said compound is 3β,17α-dihydroxypregn-4-en-20-one 3-carbamate.

4. The compound of claim 1 having the formula:

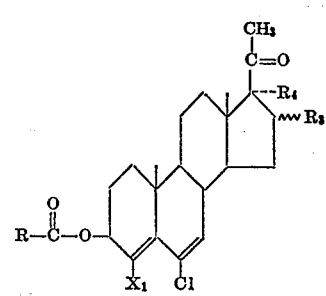

wherein $X_1$, R, $R_3$ and $R_4$ are as above.

5. The compound of claim 4 wherein said compound is 6-chloro-3β,17α-dihydroxypregna-4,6-dien - 20 - one 3-carbamate 17-acetate.

6. The compound of claim 1 having the formula:

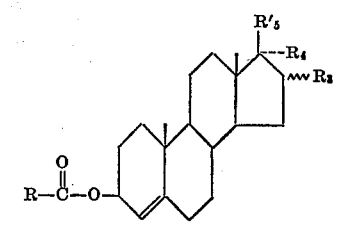

wherein R, $R_3$ and $R_4$ are as above; $R'_5$ is hydroxy or lower alkanoyloxy or $R_4$ and $R'_5$ taken together form an oxo group.

7. The compound of claim 6 wherein said compound is 17α-methylandrost-4-ene-3β,17β-diol 3-ethylcarbamate.

8. The compound of claim 1 having the formula:

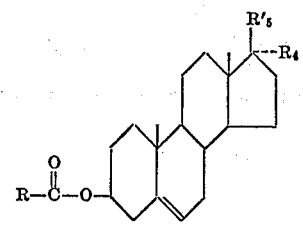

wherein R and $R_4$ are as above and $R'_5$ is individually hydroxy or lower alkanoyloxy or $R_4$ and $R'_5$ taken together form an oxo group.

9. The compound of claim 8 wherein said compound is 17α-methylandrost-5-ene-3β,17β-diol 3 - phenylcarbamate.

10. A process for obtaining a compound selected from the group consisting of compounds of the formulas:

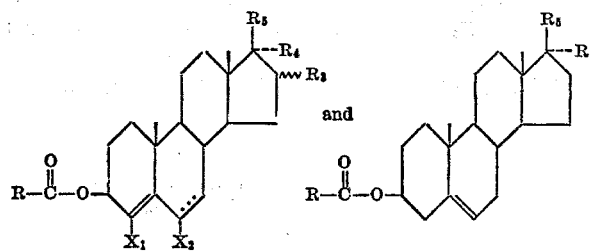

and wherein R is

$X_1$ and $X_2$ are halogen or hydrogen; $R_1$ and $R_2$ are hydrogen, lower alkyl, lower alkenyl or aryl; $R_3$ is hydrogen, lower alkyl or lower alkylidene; $R_4$ is individually hydrogen, lower alkyl, hydroxy or lower alkanoyloxy; $R_5$ is individually hydroxy, acetyl or lower alkanoyloxy or

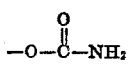

or $R_4$ and $R_5$ taken together form an oxo group; and the dotted bond is a single bond or a double bond between carbon atoms in the 6 or 7 position; with the proviso that when $R_5$ is

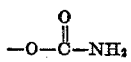

hydroxy or lower alkanoyloxy, $R_4$ is hydrogen or lower alkyl and when $R_5$ is acetyl, $R_4$ is hydroxy or lower alkanoyloxy; and with the further proviso that when $X_1$ and $X_2$ are hydrogen, the dotted bond is a single bond;

comprising reacting a compound selected from the group consisting of compounds of the formulas:

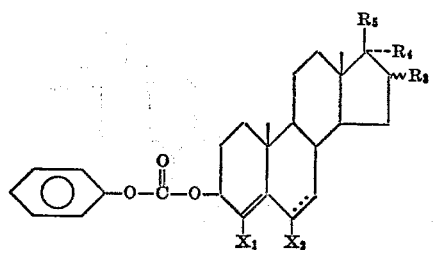

and

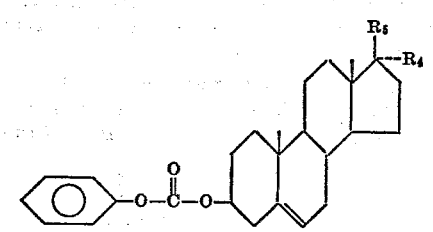

wherein $X_1$, $X_2$, $R_3$, $R_4$, $R_5$ and the dotted bond are as above;

with an amine compound of the formula:

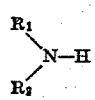

wherein $R_1$ and $R_2$ are as above.

11. The process of claim 10 wherein an excess of the amine compound is utilized as the solvent for the process.

12. A process for obtaining a compound selected from the group consisting of compounds of the formulas:

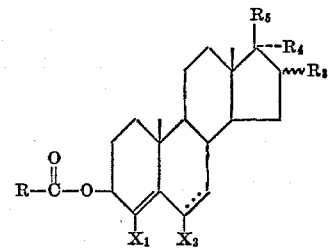

and

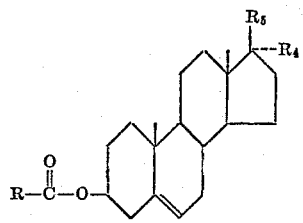

wherein R is

$X_1$ and $X_2$ are halogen or hydrogen; $R_1$ is hydrogen; $R_2$ is lower alkyl, lower alkenyl or aryl; $R_3$ is hydrogen, lower alkyl or lower alkylidene; $R_4$ is individually hydrogen, lower alkyl, hydroxy or lower alkanoyloxy; $R_5$ is individually hydroxy, or lower alkenoyloxy; $R_5$ is individually hydroxy, acetyl, lower alkanoyloxy or

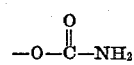

or $R_4$ and $R_5$ taken together from an oxo group; and the dotted bond is a single bond or a double bond between carbon atoms in the 6 or 7 position; with the proviso that when $R_5$ is

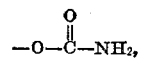

hydroxy or lower alkanoyloxy, $R_4$ is hydrogen or lower alkyl and when $R_5$ is acetyl, $R_4$ is hydroxy or lower alkanoyloxy; and with the further proviso that when $X_1$ and $X_2$ are hydrogen, the dotted bond is a single bond;

comprising reacting a compond selected from the group consisting of compounds of the formulas:

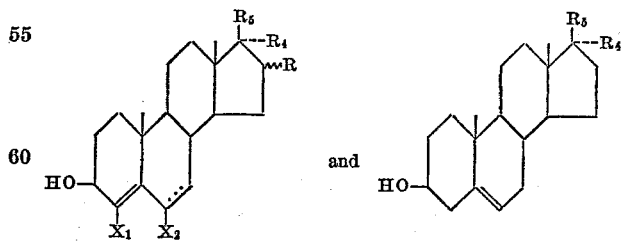

wherein $X_1$, $X_2$, $R_3$, $R_4$, $R_5$ and the dotted bond are as above;

with a compond of the formula:

$$R_2-N=C=O$$

wherein $R_2$ is as above.

13. The process of claim 12 wherein said process is carried out in the presence of an organic amine base.

14. The process of claim 13 wherein said organic amine base is selected from the group consisting of pyridine, triethylamine and collidine.

15. A process for obtaining a compound selected from the group consisting of compounds of the formulas:

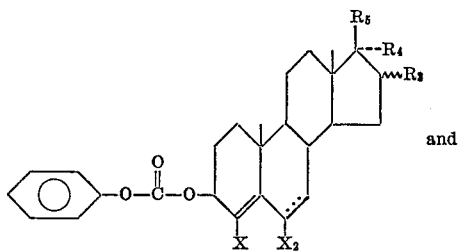

and

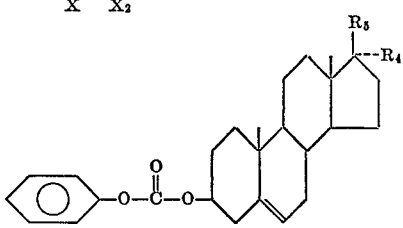

wherein $X_1$ and $X_2$ are halogen or hydrogen; $R_3$ is hydrogen, lower alkyl or lower alkylidene; $R_4$ is individually hydrogen, lower alkyl, hydroxy or lower alkanoyloxy; $R_5$ is individually hydroxy, acetyl, lower alkanoyloxy or

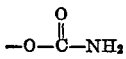

or $R_4$ and $R_5$ taken together form an oxo group; and the dotted bond is a single bond or a double bond between carbon atoms in the 6 or 7 position; with the proviso that when $R_5$ is

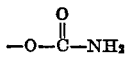

hydroxy or lower alkanoyloxy, $R_4$ is hydrogen or lower alkyl and when $R_5$ is acetyl, $R_4$ is hydroxy or lower alkanoyloxy; and with the further proviso that when $X_1$ and $X_2$ are hydrogen, and dotted bond is a single bond;

comprising reacting a compound selected from the group consisting of compounds of the formulas:

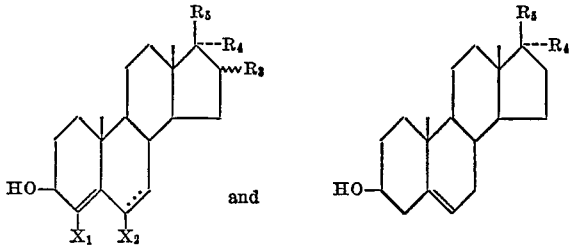

wherein $X_1$, $X_2$, $R_3$, $R_4$, $R_5$ and the dotted bond are as above;

with phenyl chloroformate.

16. The process of claim 15 wherein said process is carried out in the presence of an organic amine base.

17. The process of claim 16 wherein said organic amine base is selected from the group consisting of pyridine, triethylamine and collidine.

18. A process for obtaining a compound selected from the group consisting of compounds of the formulas:

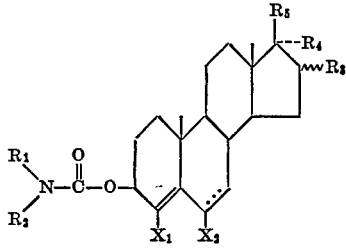

and

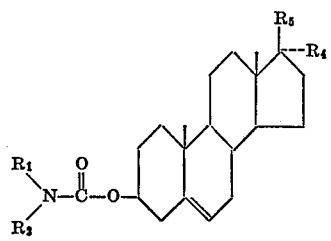

wherein $X_1$ and $X_2$ are halogen or hydrogen; $R_1$ and $R_2$ are hydrogen, lower alkyl, lower alkenyl or aryl; $R_3$ is hydrogen, lower alkyl or lower alkylidene; $R_4$ is individually hydrogen, lower alkyl, hydroxy or lower alkanoyloxy; $R_5$ is individually hydroxy, acetyl, lower alkanoyloxy or

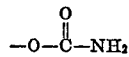

or $R_4$ and $R_5$ taken together form an oxo group; and the dotted bond is a single bond or a double bond between carbon atoms in the 6 and 7 position; with the proviso that when $R_5$ is

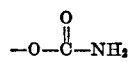

hydroxy or lower alkanoyloxy, $R_4$ is hydrogen or lower alkyl and when $R_5$ is acetyl, $R_4$ is hydroxy or lower alkanoyloxy; and with the further proviso that when $X_1$ and $X_2$ are hydrogen, the dotted bond is a single bond;

comprising reacting a compound selected from the group consisting of compounds of the formulas:

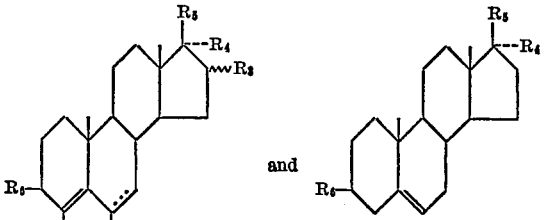

wherein $R_6$ is hydroxy or

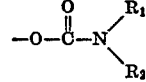

$X_1$, $X_2$, $R_1$, $R_2$, $R_3$, $R_4$, $R_5$ and the dotted bond are as above; and at least one of $R_5$ and $R_6$ is hydroxy;

with sodium cyanate and trifluoroacetic acid.

19. The process of claim 18 wherein said process is carried out at a temperature of 0° C. to 30° C.

References Cited
UNITED STATES PATENTS
3,470,162  9/1969  Edwards _____ 260—239.57
3,510,478  5/1970  Fritsch et al. ____ 260—239.57

OTHER REFERENCES
Chemical Abstracts (1962), col. 4725(e).

ELBERT L. ROBERTS, Primary Examiner

U.S. Cl. X.R.

260—397.5; 424—243

UNITED STATES PATENT OFFICE
CERTIFICATE OF CORRECTION

Patent No. 3,787,453     Dated January 22, 1974

Inventor(s) Kenneth Earl Fahrenholtz

It is certified that error appears in the above-identified patent and that said Letters Patent are hereby corrected as shown below:

Column 1 - Formula II

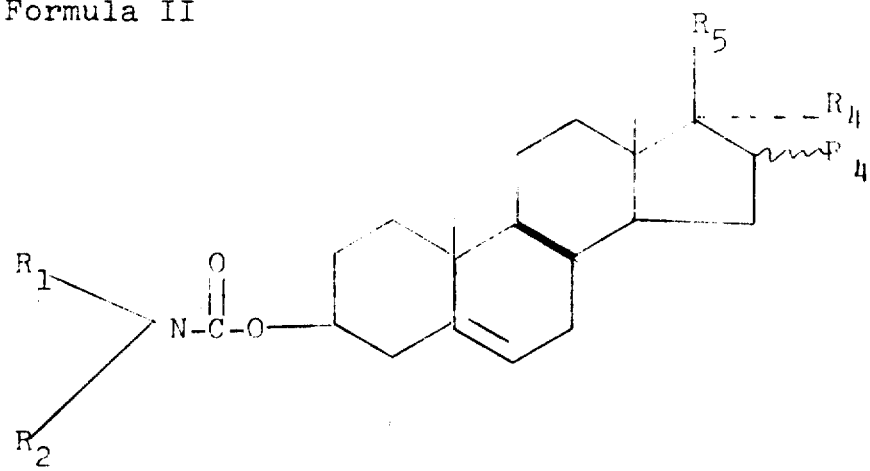

should be

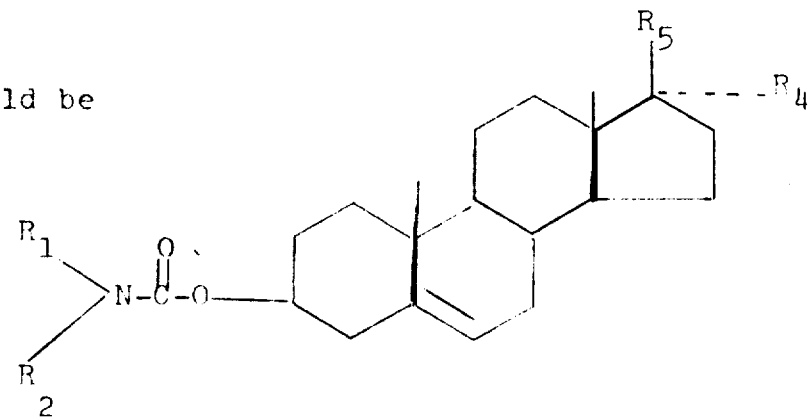

UNITED STATES PATENT OFFICE
CERTIFICATE OF CORRECTION

Patent No. 3,787,453      Dated January 22, 1974

Inventor(s) Kenneth Earl Fahrenholtz

It is certified that error appears in the above-identified patent and that said Letters Patent are hereby corrected as shown below:

Column 2 - Formula 1a

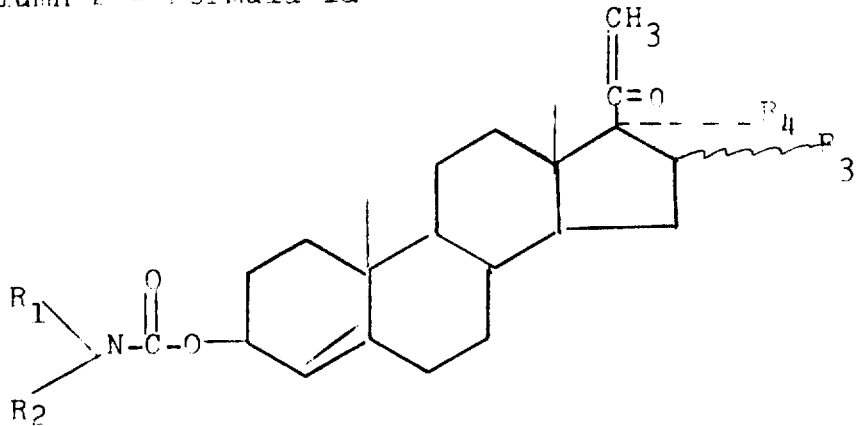

should be

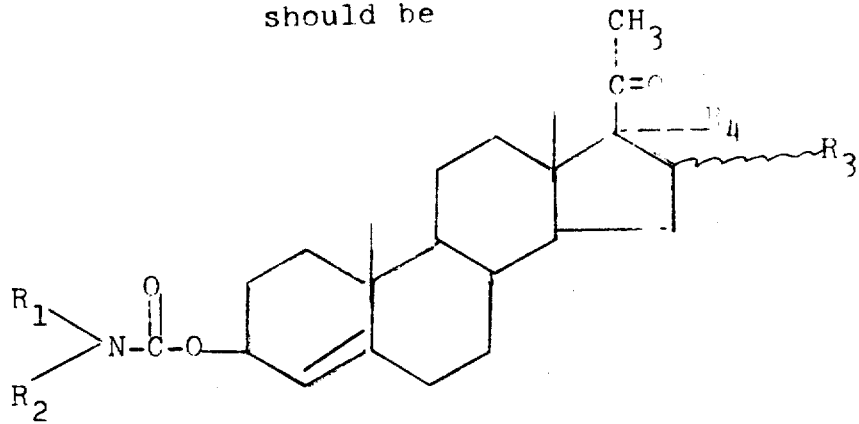

UNITED STATES PATENT OFFICE
CERTIFICATE OF CORRECTION page 3

Patent No. 3,787,453  Dated January 22, 1974

Inventor(s) Kenneth Earl Fahrenholtz

It is certified that error appears in the above-identified patent and that said Letters Patent are hereby corrected as shown below:

Column 3 Formula II a

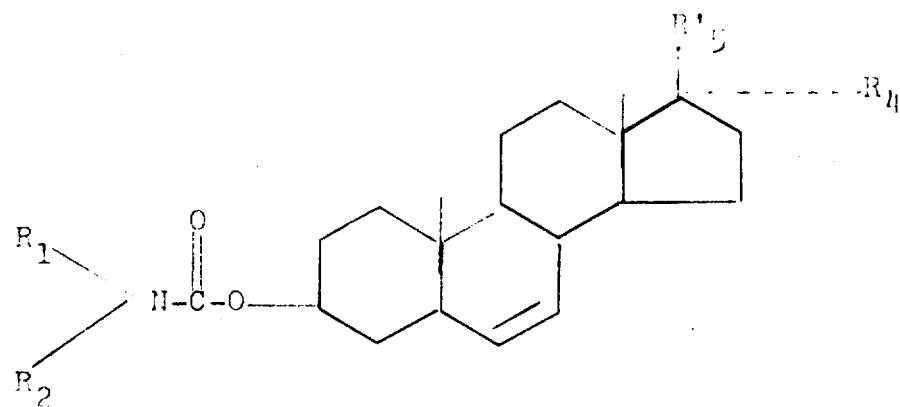

should be

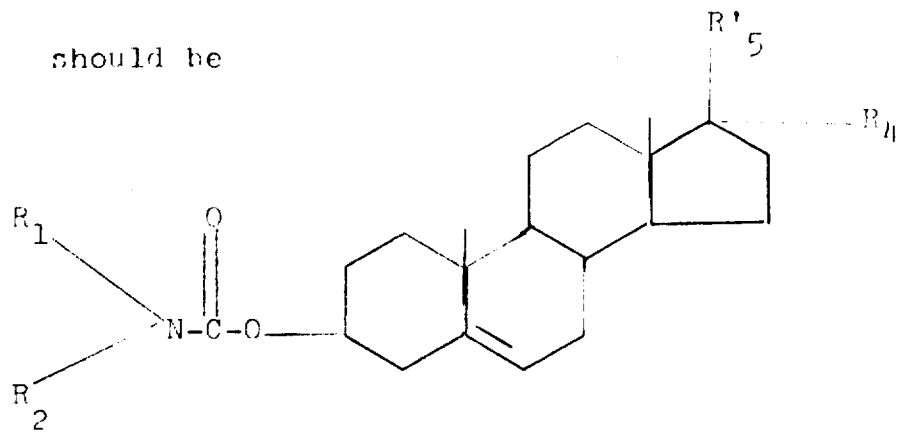

UNITED STATES PATENT OFFICE
CERTIFICATE OF CORRECTION

Patent No. 3,787,453                    Dated    January 22, 1974

Inventor(s)  Kenneth Earl Fahrenholtz

It is certified that error appears in the above-identified patent and that said Letters Patent are hereby corrected as shown below:

The first formula in Claim 1

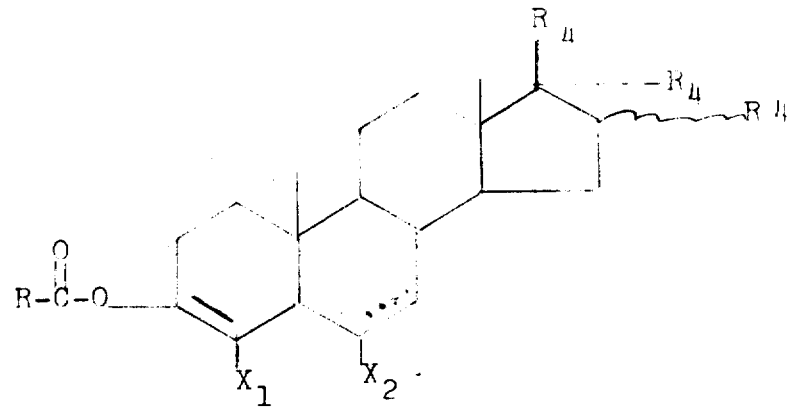

should be

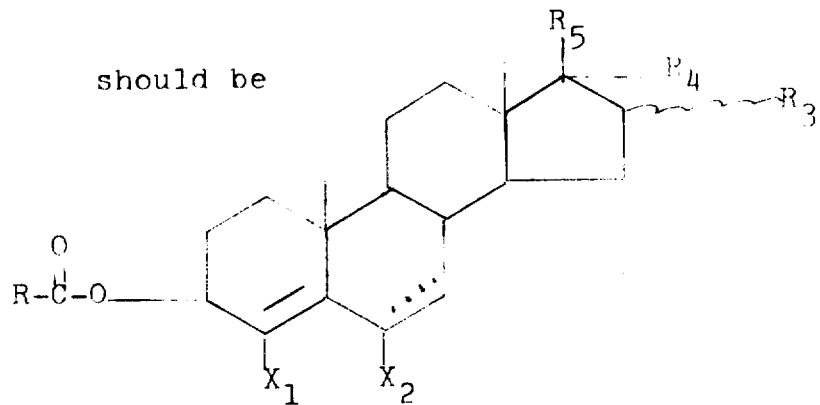

UNITED STATES PATENT OFFICE
CERTIFICATE OF CORRECTION

Patent No. 3,787,453          Dated January 22, 1974

Inventor(s)   Kenneth Earl Fahrenholtz

It is certified that error appears in the above-identified patent and that said Letters Patent are hereby corrected as shown below:

Column 19, second part of first formula in Claim 10

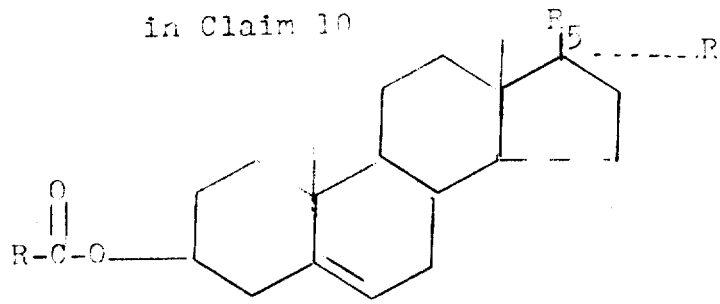

should be

UNITED STATES PATENT OFFICE
CERTIFICATE OF CORRECTION

Patent No. 3,787,453   Dated January 22, 1974

Inventor(s) Kenneth Earl Fahrenholtz

It is certified that error appears in the above-identified patent and that said Letters Patent are hereby corrected as shown below:

Column 20  first part of second formula in Claim 12

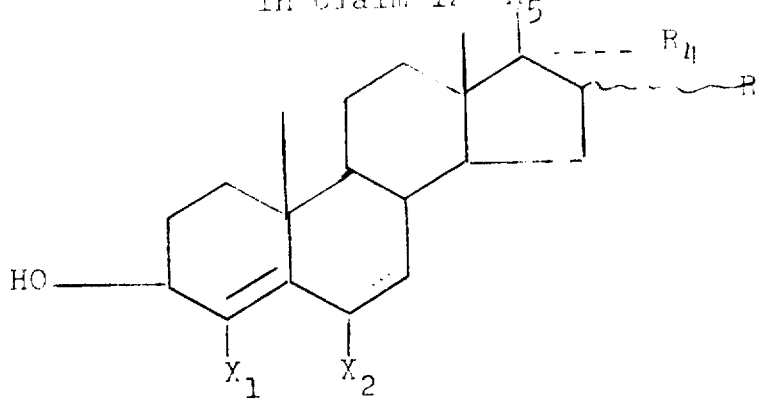

should be

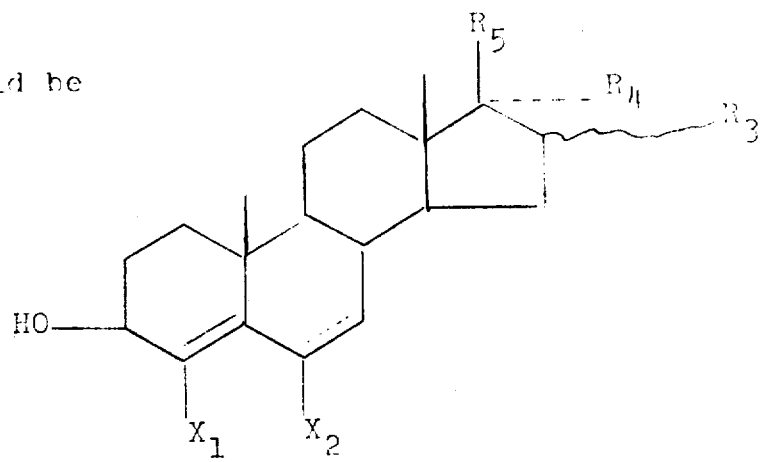

Signed and sealed this 6th day of August 1974.

(SEAL)
Attest:

McCOY M. GIBSON, JR.          C. MARSHALL DANN
Attesting Officer             Commissioner of Patents